United States Patent
Robinson et al.

(10) Patent No.: US 11,548,621 B1
(45) Date of Patent: Jan. 10, 2023

(54) AIRCRAFT AIRFOIL HAVING AN INTERNAL THRUST UNIT, AND AIRCRAFT HAVING THE SAME

(71) Applicant: Horizon Aircraft Inc., Lindsay (CA)

(72) Inventors: Eric Brian Robinson, City of the Kawartha Lakes (CA); Eric Brandon Robinson, Whitby (CA)

(73) Assignee: Horizon Aircraft Inc., Lindsay (CA)

( * ) Notice: Subject to any disclaimer, the term of this patent is extended or adjusted under 35 U.S.C. 154(b) by 0 days.

(21) Appl. No.: 17/519,359

(22) Filed: Nov. 4, 2021

(51) Int. Cl.
*B64C 21/08* (2006.01)
*B64C 21/02* (2006.01)
*B64C 3/32* (2006.01)
*B64C 9/38* (2006.01)
*B64C 29/00* (2006.01)
*B64D 27/12* (2006.01)

(52) U.S. Cl.
CPC .............. *B64C 21/08* (2013.01); *B64C 3/32* (2013.01); *B64C 9/38* (2013.01); *B64C 21/025* (2013.01); *B64C 29/0066* (2013.01); *B64D 27/12* (2013.01)

(58) Field of Classification Search
CPC . B64C 21/08; B64C 21/025; B64C 2003/142; B64C 3/32; B64C 9/38; B64C 15/14; B64C 29/0025; B64C 29/005; B64C 29/0066; B64C 15/02; B64D 27/06; B64D 27/12; B64D 27/18
See application file for complete search history.

(56) References Cited

U.S. PATENT DOCUMENTS

| | | | |
|---|---|---|---|
| 2,646,945 A * | 7/1953 | Perry | B64C 21/025 244/204 |
| 3,752,417 A * | 8/1973 | Lagace | B64C 29/0025 244/12.2 |
| 5,096,140 A * | 3/1992 | Dornier, Jr. | B64C 29/0033 244/12.4 |
| 5,868,355 A | 2/1999 | Carter | |

(Continued)

FOREIGN PATENT DOCUMENTS

| | | | | |
|---|---|---|---|---|
| DE | 699066 C | * | 11/1940 | ........... B64C 21/025 |
| GB | 735065 A | * | 8/1955 | ............. B64D 27/18 |

OTHER PUBLICATIONS

Office Action for U.S. Appl. No. 16/880,610 dated Aug. 27, 2020.
Office Action for U.S. Appl. No. 16/880,610 dated Nov. 13, 2020.

*Primary Examiner* — Tien Q Dinh
*Assistant Examiner* — William L Gmoser
(74) *Attorney, Agent, or Firm* — Ridout & Maybee LLP

(57) ABSTRACT

An aircraft airfoil having an internal thrust unit and an aircraft having the same are provided. The airfoil includes a skin structure having a lower surface extending between a leading edge and a trailing edge of the airfoil over which air flows during forward flight. A thrust system is connected to the skin structure and includes a thrust unit generating an airflow that is at least partially expelled through an outlet in the lower surface of the skin structure. At least one outlet cover is connected to the skin structure and movable between a forward flight position, in which the at least one outlet cover is configured to deflect the airflow in an at least partially rearward direction, and a vertical flight position, in which the at least one outlet cover is substantially clear of the airflow which is directed in an at least partially downward direction.

13 Claims, 10 Drawing Sheets

(56) References Cited

U.S. PATENT DOCUMENTS

| | | |
|---|---|---|
| 6,860,449 B1 | 3/2005 | Chen |
| 7,823,838 B1 * | 11/2010 | Denning ................ B64C 15/02 244/55 |
| 2017/0334582 A1 | 11/2017 | Huang et al. |
| 2019/0023389 A1 | 1/2019 | Murrow et al. |
| 2019/0270517 A1 * | 9/2019 | Morgan ................ B64C 11/001 |
| 2021/0300540 A1 * | 9/2021 | Robertson ............... B64C 21/08 |

* cited by examiner

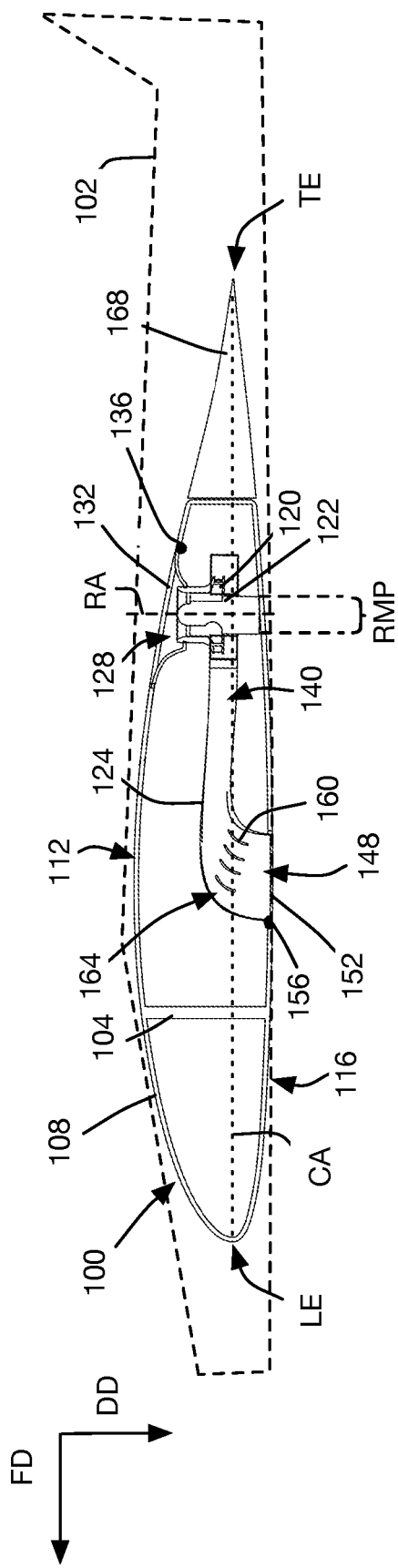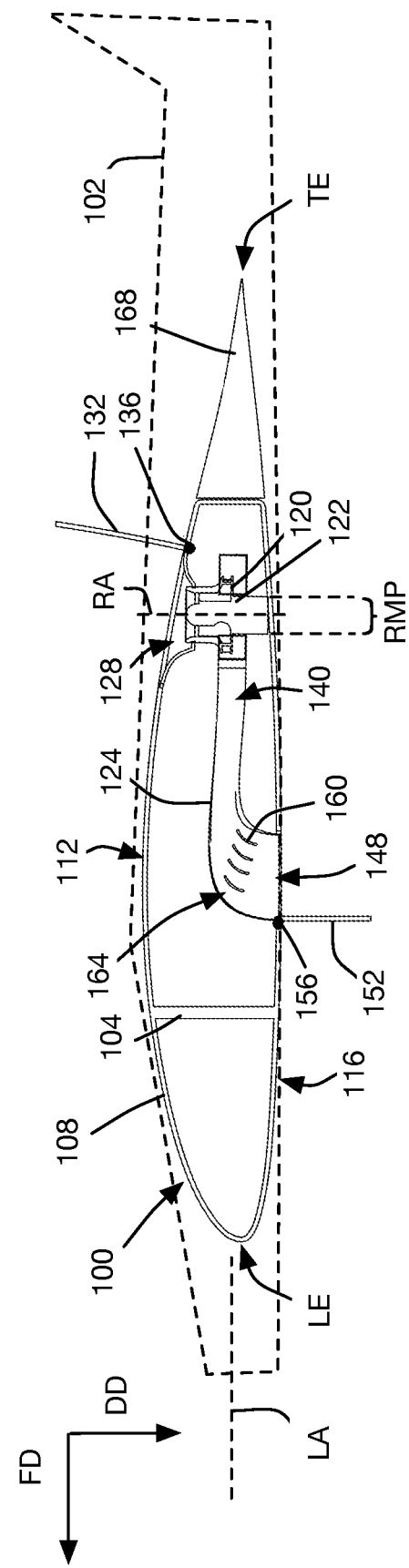

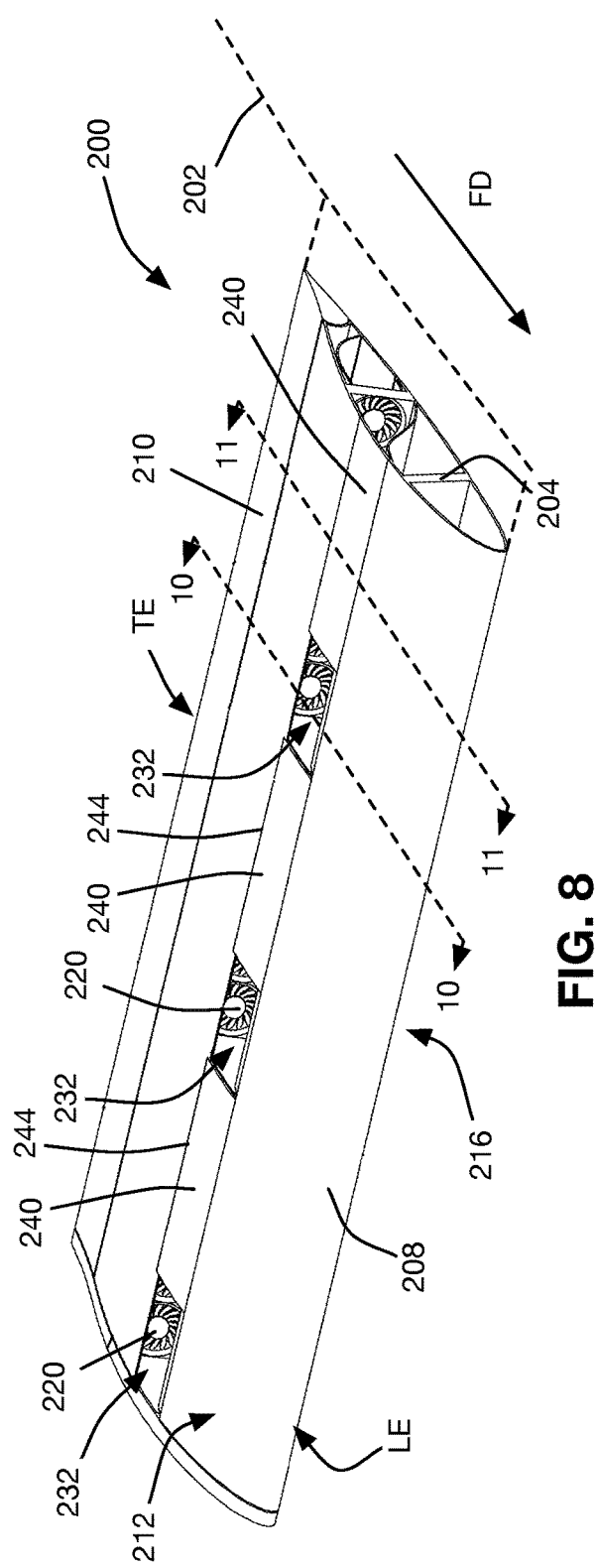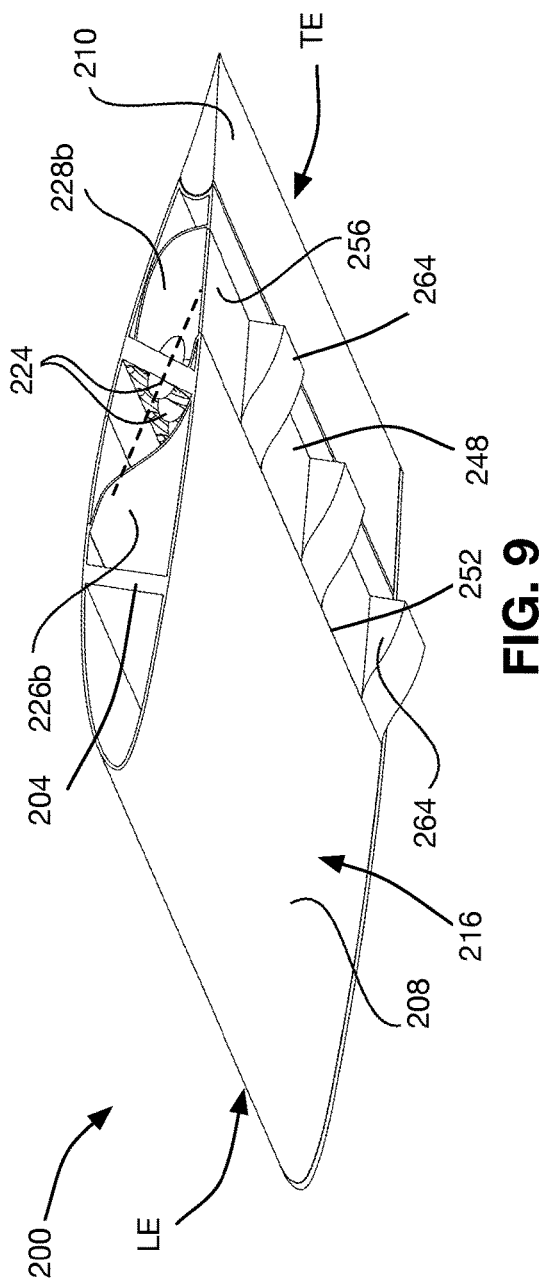

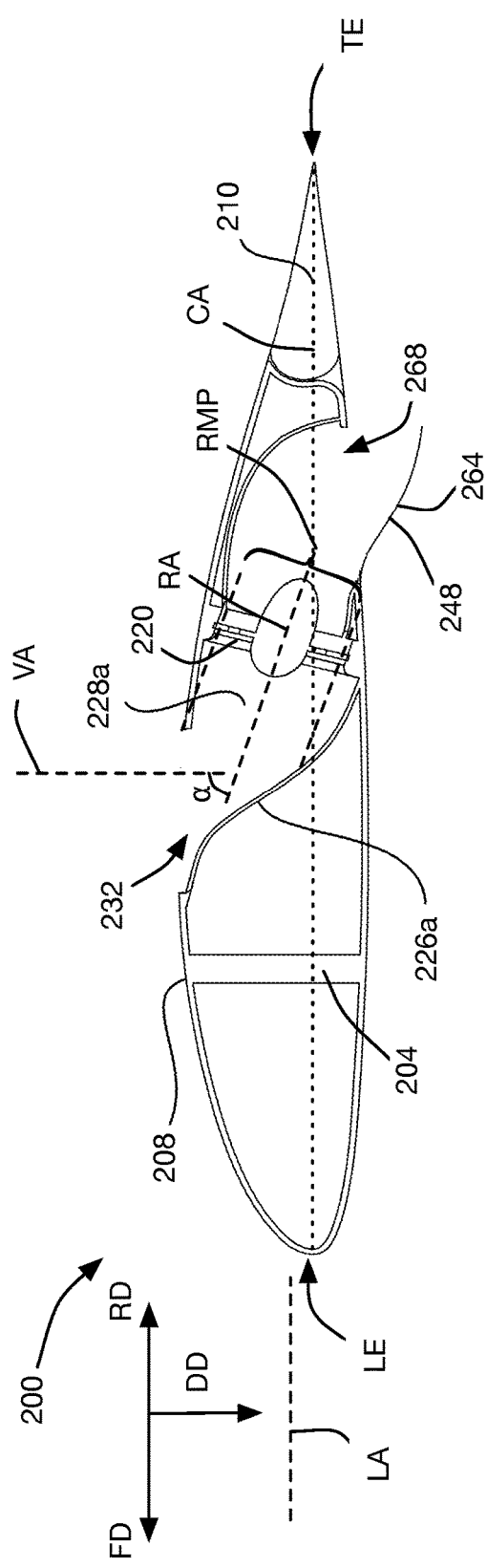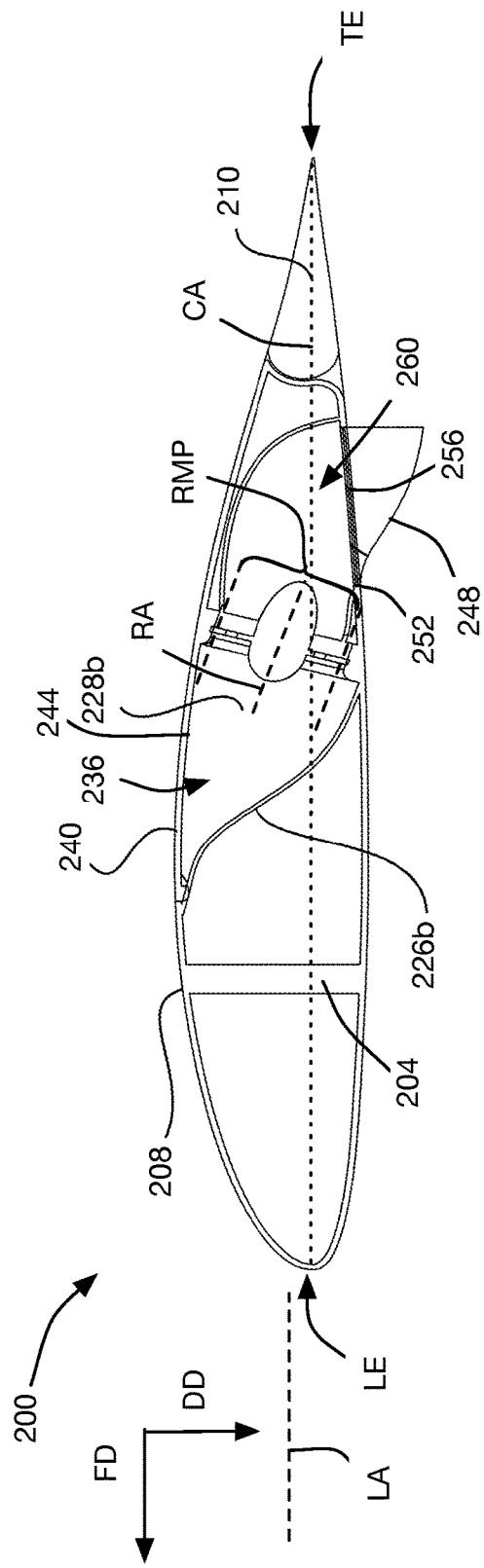
FIG. 10
FIG. 11

AIRCRAFT AIRFOIL HAVING AN INTERNAL THRUST UNIT, AND AIRCRAFT HAVING THE SAME

FIELD

The invention relates to the field of aircraft, and, more particularly, to an aircraft airfoil having an internal thrust unit, and an aircraft having the same.

BACKGROUND OF THE DISCLOSURE

Aircraft designed to takeoff, hover, and land vertically or substantially vertically have inspired generations of aerospace designers since Sikorsky's first helicopter took flight in September of 1939. Traditionally, these designs were limited to helicopter-type configurations that have a single large rotor, or, in some cases, two large rotors. However, with the systematic improvement in lightweight aerospace materials, battery and electric motor technology, and ducted fans, new vertical take-off and landing ("VTOL") or short take-off and landing ("STOL") designs are becoming practical.

Modern VTOL or STOL designs often leverage this new distributed thrust schema wherein lifting fans are positioned in idealized locations around or within an aircraft and are powered by electric motors connected to highly dense energy sources. These fans are often oriented so that their thrust vector is vertically or substantially vertically downward, with instances of upward thrust useful in some airfoil applications, and act by drawing air in through an inlet whereby a fan or propeller propels the air mass. The reactionary force concordantly produces a thrust vector to lift the aircraft vertically from the ground, arrest downward velocity, or otherwise produce aerodynamic balancing forces. When the aircraft is at a desired height, the aircraft may employ one or more power systems to generate forward thrust to begin moving horizontally.

One such schema that has been investigated is to place lift fans within the airfoils, canards or body of a VTOL or STOL aircraft. This has been attempted by many leading aerospace agencies beginning in the early 1960s. However, this configuration has been historically very challenging. Many aerodynamic and structural problems manifest with high-power fans embedded and operating within the airfoils (e.g., wings, canards, and empennage) and/or fuselage of an aircraft. These problems include airflow disturbance at the fan inlets that reduce efficiency, complex pitching moments during transition to and from forward flight, high drag forces during forward flight due to the open-duct free-stream airflow interference, reduction in fan thrust nearing the ground, and other structural problems related to lift fans and their supporting architecture.

One such design is proposed by U.S. Patent Application Publication No. 2019/0023389 to Murrow et al., wherein vertical thrust fans are disposed in the wing structure and exposed by separation of fore and aft portions of the skin structure of the wing. The fore and aft portions translate forward and backward, respectively, and pivot downwards to form a channel to focus the thrust provided by the vertical thrust fans. With this configuration, however, forward thrust is provided by a separate thrust unit, resulting in extra weight.

SUMMARY OF THE DISCLOSURE

In an aspect, there is provided an aircraft airfoil having an internal thrust unit, comprising: a skin structure of the airfoil having a lower surface extending between a leading edge and a trailing edge of the airfoil over which air flows during forward flight of the aircraft; a thrust system connected to the skin structure and including a thrust unit generating an airflow that is at least partially expelled through an outlet in the lower surface of the skin structure; and at least one outlet cover connected to the skin structure and movable between a forward flight position, in which the at least one outlet cover is configured to deflect the airflow in an at least partially rearward direction, and a vertical flight position, in which the at least one outlet cover is substantially clear of the airflow which is directed in an at least partially downward direction.

A vent in the at least one outlet cover can deflect the airflow in the at least partially rearward direction. The aircraft airfoil can further comprise a deflection surface moveably connected to the skin structure between a forward flight position, in which the deflection surface is substantially clear of the airflow generated by the thrust system and deflected by the outlet cover in the forward flight position, and a vertical flight position, in which the deflection surface is positioned to deflect the airflow in an at least partially downward direction. The airflow can be a first airflow, the outlet can be a first outlet, the thrust unit can be a first thrust unit in fluid communication with a first channel of the thrust system extending to the first outlet, and the airfoil can further comprise a second thrust unit in fluid communication with a second channel having a second outlet that is substantially closed when the at least one outlet cover is in the forward flight position and that is substantially open when the at least one outlet cover is in the vertical flight position to allow the second thrust unit to generate a second airflow in an at least partially downward direction. The first airflow generated by the first thrust unit can differ in power from the second airflow from the second thrust unit.

The aircraft airfoil can further comprise an inlet cover movably connected to the skin structure toward a rear edge of an inlet in the skin structure through which air is drawn into the second thrust unit.

In another aspect, there is provided an aircraft airfoil having an internal thrust unit, comprising: a skin structure of the airfoil, wherein a leading edge and a trailing edge of the airfoil delineate an upper surface and a lower surface of the skin structure over which air flows during forward flight of the aircraft; a thrust unit positioned entirely between the upper surface and the lower surface of the skin structure, the thrust unit generating an airflow that is at least partially expelled through an outlet along the lower surface of the skin structure; and an airflow redirection structure movable between a forward flight position, in which the airflow redirection structure directs the airflow in an at least partially rearward direction, and a vertical flight position, in which the airflow redirection structure directs the airflow in an at least partially downward direction.

The airflow redirection structure can include at least one outlet cover that is connected to the skin structure and movable between the forward flight position, in which the at least one outlet cover is positioned to deflect the airflow in the at least partially rearward direction, and a vertical flight position, in which the at least one outlet cover is substantially clear of the airflow that is directed in an at least partially rearward direction. The at least one outlet cover can have a vent that directs the airflow in the at least partially rearward direction when the at least one outlet cover is in in the forward flight position. The airflow redirection structure can include a deflection surface connected to the skin structure and moveable between the forward flight position, in which the deflection surface is substantially clear of the airflow generated by the thrust unit, and a vertical flight position, in which the deflection surface is positioned to deflect the airflow in the at least partially downward direction. The deflection surface can be provided by a flap. A channel can be formed between the at least one outlet cover and the flap to direct the airflow in the at least partially downward direction when the at least one outlet cover and the flap are in the vertical flight position. The thrust unit can be a first thrust unit, and the airfoil can include a second thrust unit that is conditionable between a forward flight mode, in which a second airflow generated by the second thrust unit is reduced, and a vertical flight mode, in which the second airflow generated by the second thrust unit is increased and directed in an at least partially downward direction.

In a further aspect, there is provided an aircraft airfoil having an internal thrust unit, comprising: a skin structure, wherein a leading edge and a trailing edge of the airfoil delineate an upper surface and a lower surface of the skin structure; a thrust unit positioned entirely between the upper surface and the lower surface, the thrust unit having a rotating member generating an airflow and having an axis of rotation; an inlet in the skin structure through which air is drawn by the thrust unit; and an outlet in the skin structure through which air from the thrust unit is expelled, wherein at least one of the inlet and the outlet is unintersected by the axis of rotation of the rotating member.

A spanwise axis can extend generally spanwise along the airfoil, a chord axis extends along a chord line of the airfoil, and a vertical axis extends normal to the spanwise axis and the chord axis, an angle between the axis of rotation of the rotating member of the thrust unit and the vertical axis being at least 20 degrees.

The inlet and the outlet can be spaced apart along a chord axis that is parallel to a chord line of the airfoil. An air channel between the thrust unit and the outlet can be tapered toward the outlet.

At least one of the inlet and the outlet can be unintersected by a projection of the rotating member parallel to the axis of rotation of the rotating member.

In still another aspect, there is provided an aircraft airfoil, comprising: an airfoil frame; a thrust system connected to the airfoil frame, the thrust system including a thrust unit generating an airflow, the thrust system directing the airflow in an at least partially rearward direction in which air travels over the airfoil during forward flight of the aircraft; and a deflection surface moveably connected to the airfoil frame between a forward flight position, in which the deflection surface is substantially clear of the airflow generated by the thrust system, and a vertical flight position, in which the deflection surface is positioned to deflect the airflow in an at least partially downward direction.

The deflection surface can be provided by a flap. The flap can at least partially form the trailing edge of the airfoil. The aircraft airfoil can further comprise at least one outlet cover connected to the airfoil frame and movable between a forward flight position, in which the at least one outlet cover is positioned to deflect the airflow in the at least partially rearward direction, and a vertical flight position, in which a channel is formed between the at least one outlet cover and the flap to direct the airflow in the at least partially downward direction. The at least one outlet cover can have a vent that is shaped to direct the airflow in the at least partially rearward direction when the at least one outlet cover is in in the forward flight position.

In still a further aspect, there is provided an aircraft airfoil having an internal thrust unit, comprising: a skin structure of the airfoil, wherein a leading edge and a trailing edge of the airfoil delineate an upper surface and a lower surface of the skin structure over which air flows during forward flight of the aircraft; and a thrust unit positioned between the upper surface and the lower surface and generating an airflow that is at least partially expelled through an outlet in the lower surface of the skin structure that is substantially spaced relative to the thrust unit along a chord line of the airfoil.

In yet another aspect, there is provided an aircraft airfoil having an internal thrust unit, comprising: a skin structure, wherein a leading edge and a trailing edge of the airfoil delineate an upper surface and a lower surface of the skin structure; and a thrust unit positioned entirely between the upper surface and the lower surface of the skin structure, the thrust unit having a rotating member generating an airflow and having an axis of rotation, wherein a spanwise axis extends generally spanwise along the airfoil, a chord axis extends along a chord line of the airfoil, and a vertical axis extends normal to the spanwise axis and the chord axis, and wherein an angle between the axis of rotation of the rotating member of the thrust unit and the vertical axis is at least 20 degrees.

In another aspect, there is provided an aircraft having an airfoil with an internal thrust unit, comprising: a skin structure of the airfoil having a lower surface extending between a leading edge and a trailing edge of the airfoil over which air flows during forward flight of the aircraft; a thrust system connected to the skin structure and including a thrust unit generating an airflow that is at least partially expelled through an outlet in the lower surface of the skin structure; and at least one outlet cover connected to the skin structure and movable between a forward flight position, in which the at least one outlet cover is configured to deflect the airflow in an at least partially rearward direction, and a vertical flight position, in which the at least one outlet cover is substantially clear of the airflow which is directed in an at least partially downward direction.

A vent in the at least one outlet cover can deflect the airflow in the at least partially rearward direction. The aircraft airfoil can further comprise a deflection surface moveably connected to the skin structure between a forward flight position, in which the deflection surface is substantially clear of the airflow generated by the thrust system and deflected by the outlet cover in the forward flight position, and a vertical flight position, in which the deflection surface is positioned to deflect the airflow in an at least partially downward direction. The airflow can be a first airflow, the outlet can be a first outlet, the thrust unit can be a first thrust unit in fluid communication with a first channel of the thrust system extending to the first outlet, and the airfoil can further comprise a second thrust unit in fluid communication with a second channel having a second outlet that is substantially closed when the at least one outlet cover is in the forward flight position and that is substantially open when the at least one outlet cover is in the vertical flight position to allow the second thrust unit to generate a second airflow in an at least partially downward direction. The first airflow generated by the first thrust unit can differ in power from the second airflow from the second thrust unit.

The aircraft airfoil can further comprise an inlet cover movably connected to the skin structure toward a rear edge of an inlet in the skin structure through which air is drawn into the second thrust unit.

In a further aspect, there is provided an aircraft having an airfoil with an internal thrust unit, comprising: a skin structure of the airfoil, wherein a leading edge and a trailing edge of the airfoil delineate an upper surface and a lower surface of the skin structure over which air flows during forward flight of the aircraft; a thrust unit positioned entirely between the upper surface and the lower surface of the skin structure, the thrust unit generating an airflow that is at least partially expelled through an outlet along the lower surface of the skin structure; and an airflow redirection structure movable between a forward flight position, in which the airflow redirection structure directs the airflow in an at least partially rearward direction, and a vertical flight position, in which the airflow redirection structure directs the airflow in an at least partially downward direction.

The airflow redirection structure can include at least one outlet cover that is connected to the skin structure and movable between the forward flight position, in which the at least one outlet cover is positioned to deflect the airflow in the at least partially rearward direction, and a vertical flight position, in which the at least one outlet cover is substantially clear of the airflow that is directed in an at least partially rearward direction. The at least one outlet cover can have a vent that directs the airflow in the at least partially rearward direction when the at least one outlet cover is in in the forward flight position. The airflow redirection structure can include a deflection surface connected to the skin structure and moveable between the forward flight position, in which the deflection surface is substantially clear of the airflow generated by the thrust unit, and a vertical flight position, in which the deflection surface is positioned to deflect the airflow in the at least partially downward direction. The deflection surface can be provided by a flap. A channel can be formed between the at least one outlet cover and the flap to direct the airflow in the at least partially downward direction when the at least one outlet cover and the flap are in the vertical flight position. The thrust unit can be a first thrust unit, and the airfoil can include a second thrust unit that is conditionable between a forward flight mode, in which a second airflow generated by the second thrust unit is reduced, and a vertical flight mode, in which the second airflow generated by the second thrust unit is increased and directed in an at least partially downward direction.

In still another aspect, there is provided an aircraft having an airfoil with an internal thrust unit, comprising: a skin structure, wherein a leading edge and a trailing edge of the airfoil delineate an upper surface and a lower surface of the skin structure; a thrust unit positioned entirely between the upper surface and the lower surface, the thrust unit having a rotating member generating an airflow and having an axis of rotation; an inlet in the skin structure through which air is drawn by the thrust unit; and an outlet in the skin structure through which air from the thrust unit is expelled, wherein at least one of the inlet and the outlet is unintersected by the axis of rotation of the rotating member.

A spanwise axis can extend generally spanwise along the airfoil, a chord axis extends along a chord line of the airfoil, and a vertical axis extends normal to the spanwise axis and the chord axis, an angle between the axis of rotation of the rotating member of the thrust unit and the vertical axis being at least 20 degrees.

The inlet and the outlet can be spaced apart along a chord axis that is parallel to a chord line of the airfoil. An air channel between the thrust unit and the outlet can be tapered toward the outlet.

At least one of the inlet and the outlet can be unintersected by a projection of the rotating member parallel to the axis of rotation of the rotating member.

In still a further aspect, there is provided an aircraft having an airfoil, comprising: an airfoil frame; a thrust system connected to the airfoil frame, the thrust system including a thrust unit generating an airflow, the thrust system directing the airflow in an at least partially rearward direction in which air travels over the airfoil during forward flight of the aircraft; and a deflection surface moveably connected to the airfoil frame between a forward flight position, in which the deflection surface is substantially clear of the airflow generated by the thrust system, and a vertical flight position, in which the deflection surface is positioned to deflect the airflow in an at least partially downward direction.

The deflection surface can be provided by a flap. The flap can at least partially form the trailing edge of the airfoil. The aircraft airfoil can further comprise at least one outlet cover connected to the airfoil frame and movable between a forward flight position, in which the at least one outlet cover is positioned to deflect the airflow in the at least partially rearward direction, and a vertical flight position, in which a channel is formed between the at least one outlet cover and the flap to direct the airflow in the at least partially downward direction. The at least one outlet cover can have a vent that is shaped to direct the airflow in the at least partially rearward direction when the at least one outlet cover is in in the forward flight position.

In still yet another aspect, there is provided an aircraft having an airfoil with an internal thrust unit, comprising: a skin structure of the airfoil, wherein a leading edge and a trailing edge of the airfoil delineate an upper surface and a lower surface of the skin structure over which air flows during forward flight of the aircraft; and a thrust unit positioned between the upper surface and the lower surface and generating an airflow that is at least partially expelled through an outlet in the lower surface of the skin structure that is substantially spaced relative to the thrust unit along a chord line of the airfoil.

In still a further aspect, there is provided an aircraft having an airfoil with an internal thrust unit, comprising: a skin structure, wherein a leading edge and a trailing edge of the airfoil delineate an upper surface and a lower surface of the skin structure; and a thrust unit positioned entirely between the upper surface and the lower surface of the skin structure, the thrust unit having a rotating member generating an airflow and having an axis of rotation, wherein a spanwise axis extends generally spanwise along the airfoil, a chord axis extends along a chord line of the airfoil, and a vertical axis extends normal to the spanwise axis and the chord axis, and wherein an angle between the axis of rotation of the rotating member of the thrust unit and the vertical axis is at least 20 degrees.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which:

FIG. 6A is a side section view of an aircraft having a wing of a VTOL or STOL aircraft in accordance with another embodiment with inlet and outlet covers of the wing in a closed position;

FIG. 6B is a side section view of the aircraft of FIG. 6A with the inlet and outlet covers in an open position;

FIG. 8 is a front, top, right isometric view of a section of the wing of a VTOL or STOL aircraft in accordance with a further embodiment wherein a set of multipurpose thrust units have open inlets, and inlet covers for a set of vertical thrust units are in a forward flight position, and a rear flap is extended rearwardly;

FIG. 9 is a front, bottom, right isometric view of a section of the wing of FIG. 8, wherein the inlet covers of the secondary thrust units are in a forward flight position;

FIG. 10 is a side section view of the wing of FIG. 8 along line 8-8 showing one of the multipurpose thrust units positioned within a duct with the outlet cover in a forward flight position;

FIG. 11 is a side section view of the wing of FIG. 8 along line 8-8 showing one of the vertical thrust units positioned within a duct, with the inlet cover and the outlet cover in the closed position;

Figure 1:
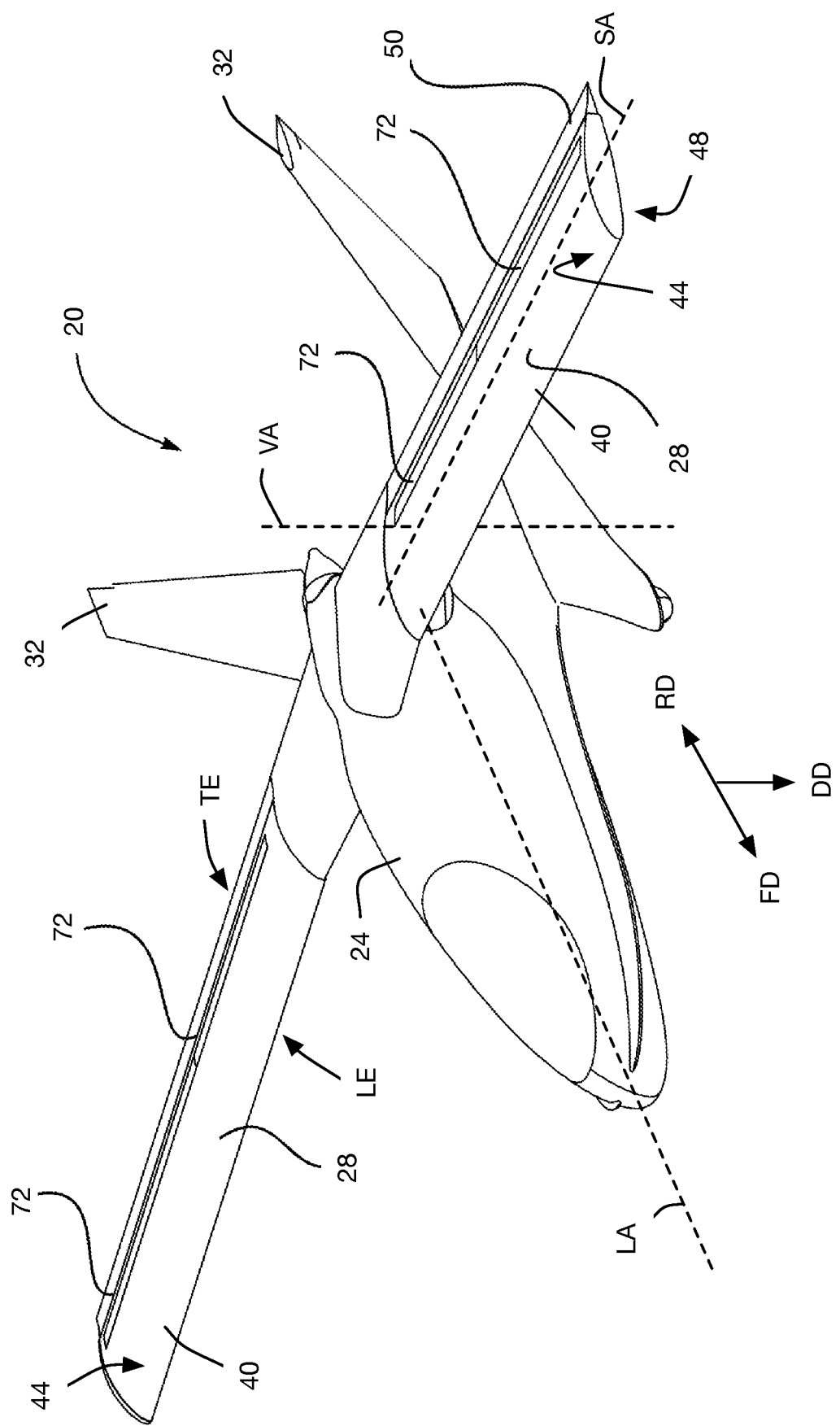
FIG. 1 is a front, top, right isometric view of a VTOL or STOL aircraft in accordance with an embodiment.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description of the fan-in-airfoil system that follows, and the embodiments described therein, are provided by way of illustration of an example, or examples, of particular embodiments of the principles, aspects or features of the invention. These examples are provided for the purposes of explanation, and not of limitation, of those principles and of the invention. In the description, like parts are marked throughout the specification and the drawing with the same respective reference numerals.

The terminology used in this specification is thought to be consistent with the customary and ordinary meaning of those terms as they would be understood by a person of ordinary skill in the aircraft industry in North America. The Applicant expressly excludes all interpretations that are inconsistent with this specification, and, in particular, expressly excludes any interpretation of the claims or the language used in this specification such as may be made in the USPTO, or in any other patent office, other than those interpretations for which express support can be demonstrated in this specification or in objective evidence of record, (for example, earlier publications by persons not employed by the USPTO or any other patent office), demonstrating how the terms are used and understood by persons of ordinary skill in the art, or by way of expert evidence of a person or persons of at least 10 years of experience in the aircraft industry in North America or equivalent.

In terms of general orientation and directional nomenclature, for aircraft described herein, the longitudinal or lengthwise direction is defined as being coincident with the fore-and-aft direction of flight of the aircraft in forward, straight, and level flight. In the case of a fixed airfoil aircraft, the longitudinal direction is parallel to the rolling direction of the wheeled landing gear. The leading direction, or leading edge lies toward the forward direction of travel; the rearward or trailing direction or trailing edge is oriented away from (i.e., backwards relative to) the normal direction of advance of the aircraft in forward flight. Unless otherwise noted, vertical, or upward and downward, are terms that use the landing terrain as a datum. Unless otherwise noted, "vertical" or "vertically" are intended to also include "substantially vertical" and "substantially vertically" respectively. In the context of the aircraft as a whole, the terms cross-wise, lateral, spanwise, or laterally outboard, or transverse, or transversely outboard refer to a distance or orientation perpendicular or substantially perpendicular relative to the longitudinal centreline of the fuselage. The commonly used engineering terms "proud", "flush", and "shy" may be used herein to denote items that, respectively, protrude beyond an adjacent element, are level with an adjacent element, or do not extend as far as an adjacent element, the terms corresponding conceptually to the conditions of "greater than", "equal to", and "less than".

The directions correspond generally to a Cartesian frame of reference in which the x-direction is longitudinal, the y-direction is lateral, and the z-direction is vertical. Pitching motion is angular motion of the aircraft about a horizontal axis perpendicular to the longitudinal direction. Yawing is angular motion about a vertical axis. Roll is angular motion about the longitudinal axis. Given that the aircraft described herein may tend to have a longitudinal axis of symmetry, a description of one half of the aircraft may generally also be intended to describe the other half as well, allowing for differences between right hand and left hand parts. Also, it may be taken as a default that the basic structure of the aircraft is of aluminum fabrication with a reinforced composite surface skin, unless otherwise shown in the illustrations or indicated in the text. Other materials such as stainless steel or wood might be also used for some components.

In this discussion it may be understood that persons of ordinary skill are familiar with the aircraft construction and maintenance in North America, and may include aircraft maintenance engineers having knowledge of US Department of Transportation, Federal Aviation Administration publication EA-AC 43.13-1A & 2A "Acceptable Methods, Techniques and Practices, Aircraft Inspection and Repair", or any successor publication thereof, as updated at the date of priority filing of this specification. This specification is to be interpreted in a manner consistent with that publication.

Disclosed herein in one embodiment is a novel airfoil and aircraft having the same. The airfoil includes a skin structure having a lower surface extending between a leading edge and a trailing edge of the airfoil over which air flows during forward flight. A thrust system is connected to the skin structure and includes a thrust unit generating an airflow that is at least partially expelled through an outlet in the lower surface of the skin structure. At least one outlet cover is connected to the skin structure and movable between a forward flight position, in which the at least one outlet cover is configured to deflect the airflow in an at least partially rearward direction, and a vertical flight position, in which the at least one outlet cover is substantially clear of the airflow which is directed in an at least partially downward direction.

FIG. 1 shows an aircraft 20 in accordance with an embodiment. The aircraft 20 is a VTOL or STOL aircraft, meaning it is capable of taking off and landing vertically, substantially vertically, or using a short horizontal surface. Although principles, aspects, and features of the invention herein may be applied to other VTOL or STOL aircraft, as may be appropriate in respect to configurations wherein there are a plurality of vertically or substantially vertically-thrusting fans located in the airfoils, it may be taken that in the embodiment illustrated in FIG. 1, the aircraft 20 is of a high-wing VTOL configuration with an airfoil optimized for efficient forward flight.

The aircraft 20 has a fuselage 24 that extends along a longitudinal axis LA. Two airfoils in the form of wings 28 extend from the fuselage 24. A tail structure connected to the fuselage 24 includes a pair of vertical stabilizers 32. In this embodiment, the two wings 28 sweep in a forward direction FD, but in other embodiments, the wings can extend substantially laterally or sweep in a rearward direction RD.

Figure 2:
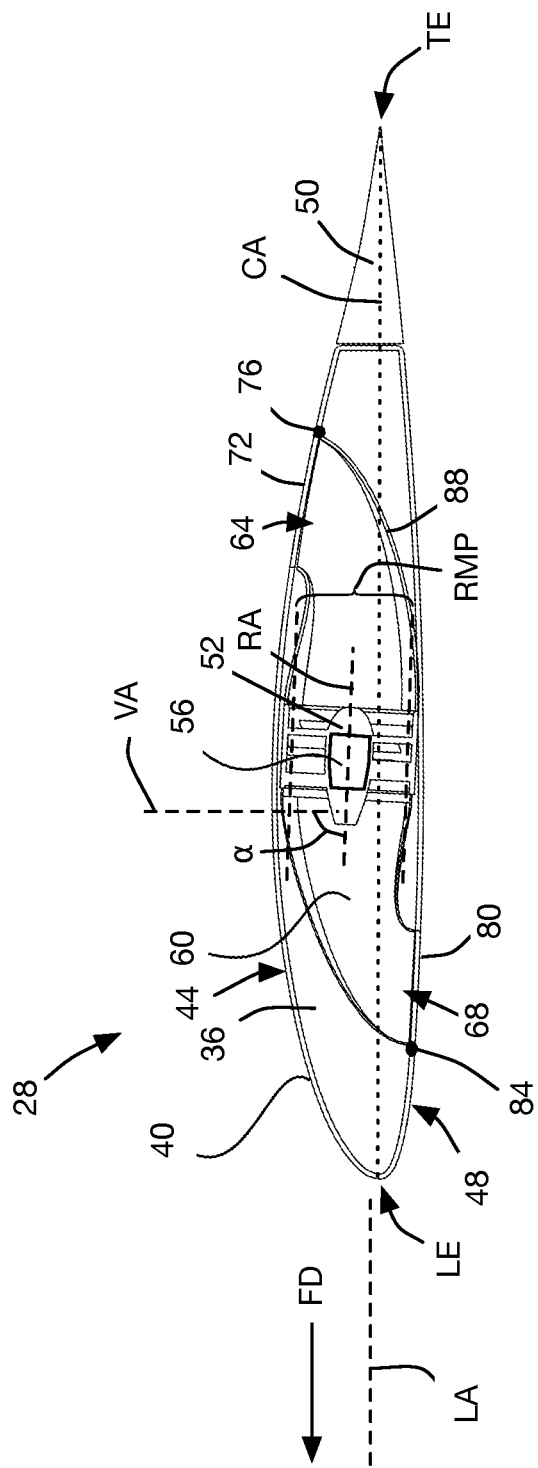
FIG. 2 is a side section view of a wing of the VTOL or STOL aircraft of FIG. 1 wherein both inlet and outlet covers covering a duct in which a thrust unit is positioned are in a horizontal flight position.

Now with reference to FIGS. 1 and 2, each of the wings 28 has a frame 36 that is secured to the fuselage 24 and over which a skin structure 40 extends. The skin structure 40 is the element or set of elements that provide the outer surface of the airfoil shape over which air flows to generate lift during forward flight. The frame 36 can be made of any suitable material or materials, such as steel or another suitable metal, carbon fiber, etc. The skin structure 40 can be made of any suitable material or materials, such as a glass or carbon composite, aluminum, stainless steel, etc. A leading edge LE and a trailing edge TE delineate an upper surface 44 and a lower surface 48 of the skin structure 40/wing 28 over which air flows during forward flight of the aircraft 20; that is, in the forward direction FD. A flap 50 is positioned towards the trailing edge TE and extends generally rearwardly, and is actuatable to reorient the flap 50 to extend at least partially downwardly to reduce the stalling speed of the wing 28.

The aircraft 20 can generate forward thrust via any known means, such as propellers and turbines mounted on the fuselage, wings, or tail structure. In order to take off and/or land, the aircraft 20 includes a thrust system that generates a downward airflow. The thrust system includes a set of thrust units 52 positioned entirely between the upper surface 44 and the lower surface 48 of the wing 28.

FIG. 2 shows one of the thrust units 52 having a rotating member that rotates to generate or increase an airflow. The rotating member in this embodiment takes the form of a rotor 56 with fan blades primarily generating an airflow and having an axis of rotation RA. The thrust units 52 draw air into an air channel 60 via an inlet 64 in the upper surface 44 of the skin structure 40 and expels it through an outlet 68 in the lower surface 48 of the skin structure 40. In this embodiment, the thrust unit 52 is an electric turbine, but can be any other suitable unit for generating an airflow. The air channel 60 tapers towards the outlet 68 to increase the speed of the airflow being expelled through the outlet 68.

Referring again to FIGS. 1 and 2, a set of inlet covers 72 is hingedly connected to the frame 36 to enable pivoting about an inlet cover pivot axis 76. The inlet covers 72 are shown in a closed position over the inlets 64 of the thrust units 52. A set of outlet covers 80 is hingedly connected to the frame 36 to enable pivoting about an outlet cover pivot axis 84, and is shown in a closed position over the outlets 68.

Each of the thrust units 52 is oriented so that the rotation axis RA of the rotating member 56 and a rotating member projection RMP (i.e., a projection of the rotor 56 parallel to the axis of rotation RA) is not aligned with and does not intersect either the corresponding inlet 64 or the corresponding outlet 68. Instead, the air channels 60 formed by the ducts redirect the airflow. A spanwise axis SA extends generally spanwise along the airfoil 28. A chord axis CA extends along a chord line of the airfoil 28. A vertical axis VA extends normal to the spanwise axis SA and the chord axis CA. An angle α between the axis of rotation RA of the rotor 56 of the thrust unit 52 and the vertical axis VA is at least 20 degrees. In particular, the angle between the axis of rotation RA of the rotor 56 of the thrust unit 52 and the vertical axis VA is almost 90 degrees. In this manner, different designs and powers of the thrust system and its thrust units 52 can be housed between the upper surface 44 and the lower surface 48 than otherwise possible.

Figure 3:
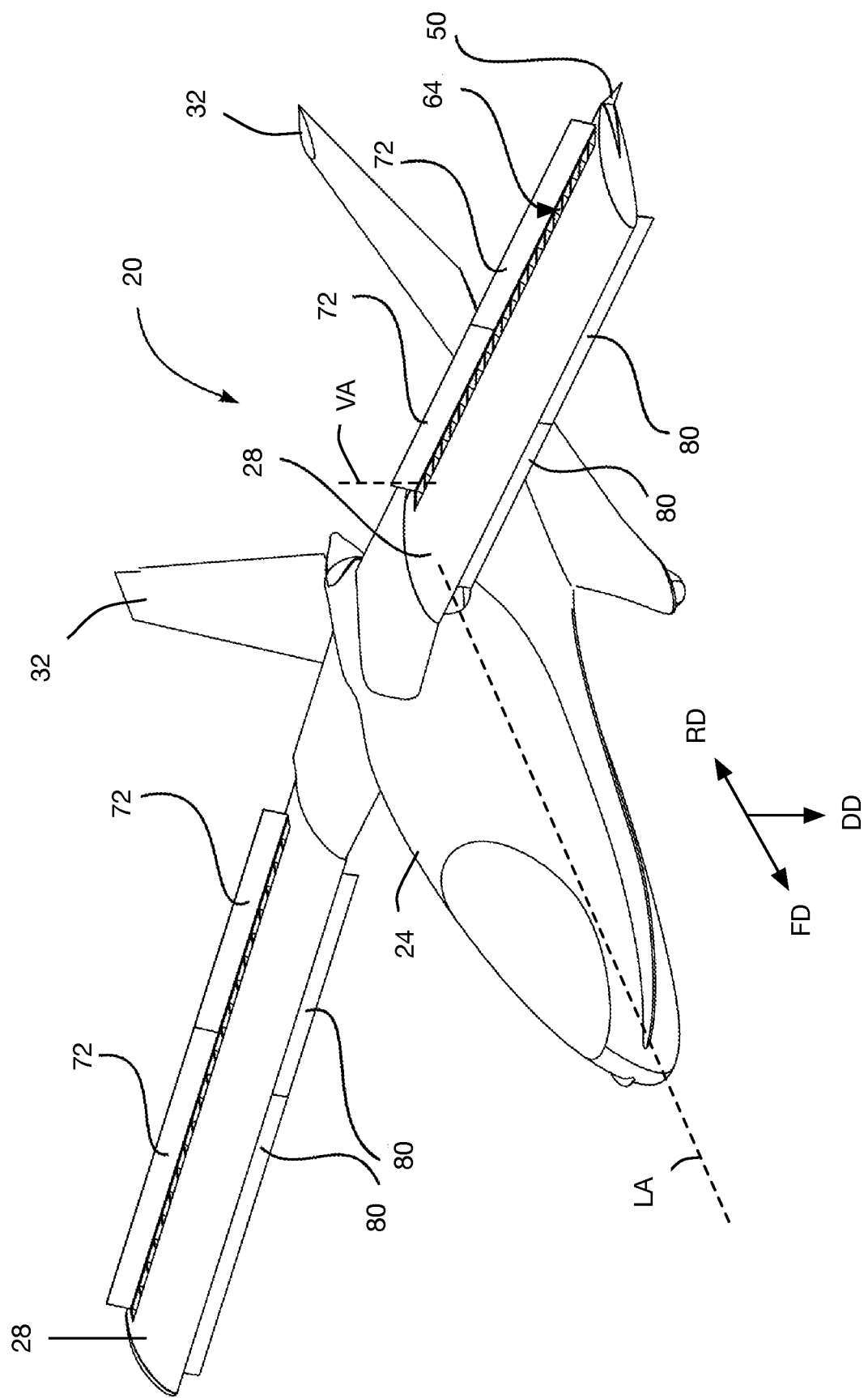
FIG. 3 is a front, top, right isometric view of the VTOL or STOL aircraft of FIGS. 1 and 2 wherein the inlet covers on upper surfaces and the outlet covers on lower surfaces of the two wings of the aircraft are in an open position.
Figure 4:
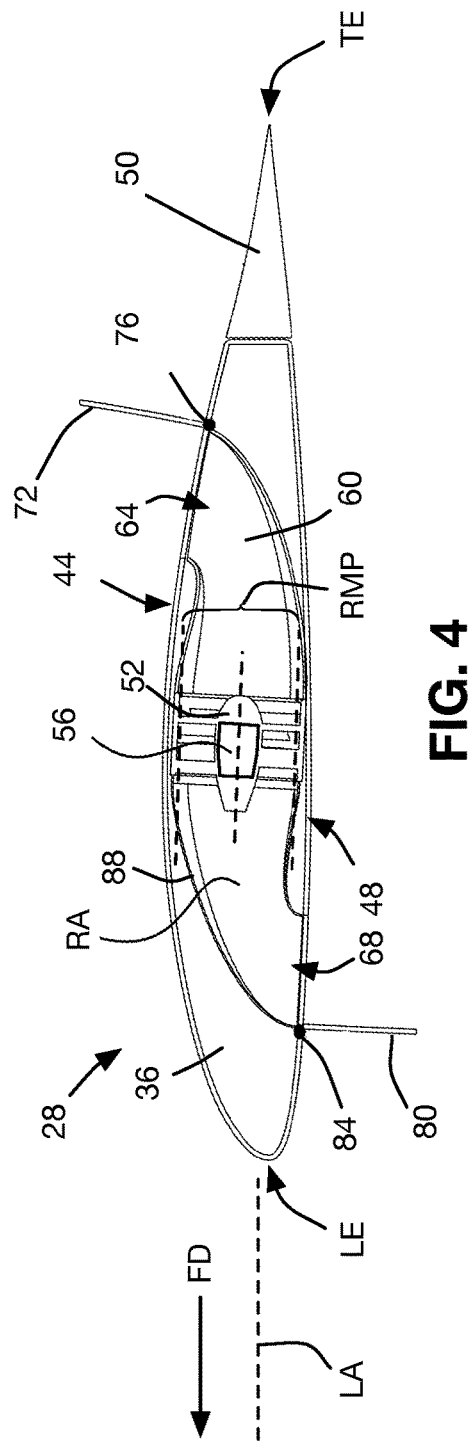
FIG. 4 is a side section view of a wing of the VTOL or STOL aircraft of FIGS. 1 and 2 wherein both the inlet and outlet covers are in the open position.
Figure 5:
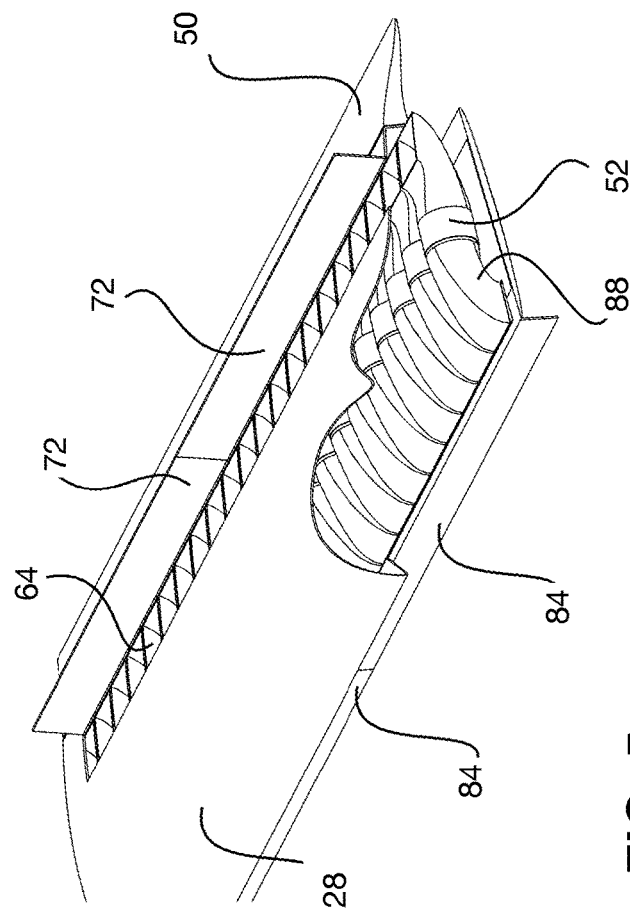
FIG. 5 is a front, top, right isometric view of a section of the wing of FIG. 4 with a portion of the skin structure cut away, exposing the ducts in which the thrust units are positioned.

The wings 28 are shown with the inlet covers 72 and the outlet covers 80 in an open position in FIGS. 3 to 5. In the open position, the inlet covers 72 expose the inlets 64 and the outlet covers 80 expose the outlets 68 to allow the thrust unit 52 to draw air in through the inlets 64 and expel the drawn air through the outlets 68, thereby generating an airflow and thrust in a substantially downward direction.

As shown in FIG. 5, each thrust 52 unit is positioned within a duct unit 88 defining the air channel 60. Each wing 28 includes a plurality of sets of thrust units 52 and duct units 88.

Figure 7:
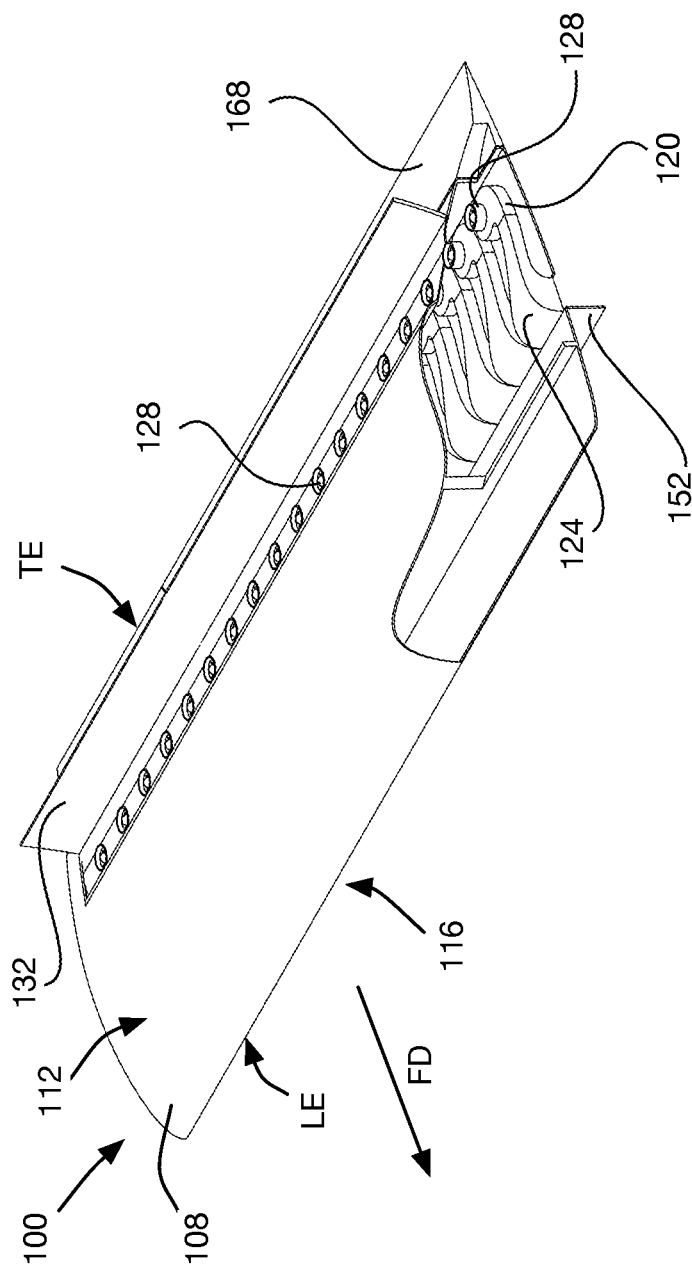
FIG. 7 is a front, top, right isometric view of a section of the wing of FIG. 6B with a portion of the skin structure cut away, exposing the ducts in which the thrust units are positioned.

An airfoil for an aircraft 102 in the form of a wing 100 in accordance with another embodiment is shown in FIGS. 6A, 6B, and 7. The wing 100 has an airfoil frame 104 that is enveloped in a skin structure 108. A leading edge LE and a trailing edge TE delineate an upper surface 112 and a lower surface 116 of the skin structure 108 of the wing 100.

Positioned entirely between the upper surface 112 and the lower surface 116 is a thrust system that includes a set of thrust units 120, each of which is coupled to a duct unit 124. In the illustrated example, each thrust unit 120 is an electric turbine, but can be any other suitable type of unit for generating an air flow. A rotating member in the form of a rotor 122 of the thrust unit 120 rotates about a rotation axis RA that is generally normal to a longitudinal axis LA of the wing 100 aligned with a direction of forward flight of the aircraft 102. Rotation of the rotor unit 122 draws air through an inlet 128 in the upper surface 112. The inlet 128 is selectively openable via an inlet cover 132 that is hingedly connected to the airfoil frame 104 at an inlet cover pivot axis 136. The thrust unit 120 impels air through an air channel 140 in the duct unit 124 and out an outlet 148 in the lower surface 116 of the wing 100. The outlet 148 is selectively openable via an outlet cover 152 that is hingedly connected to the airfoil frame 104 at an outlet cover pivot axis 156. The inlet cover 132 and the outlet cover 152 are shown in the open position in FIGS. 6B and 7. While the inlet cover 132 and the outlet cover 152 are hingedly connected to the airfoil frame 104 is this embodiment, it will be appreciated that these components can be connected to any other any other element of the wing 100. Further, the inlet cover 132 and the outlet cover 152 can be moved in any suitable manner to cover and uncover the inlet 128 and the outlet 148. A rotating member projection RMP (i.e., a projection of the rotor 122 parallel to the axis of rotation RA) is not aligned with and does not intersect either the corresponding inlet 128 or the corresponding outlet 148.

A set of air flow guides 160 are positioned within the air channel 140 to redirect the air flow generated by the thrust unit 120 at a bend 164 in the air channel 120 where the air channel 120 changes direction from a generally forward direction FD to a generally downward direction DD.

A flap 168 is positioned towards the trailing edge TE, and is actuatable to reorient the flap 168 to extend at least partially downwardly to reduce the stalling speed of the wing 100.

In this embodiment, the outlet 148 is unintersected by the axis of rotation RA of the rotor 122.

The inlet and the outlet are spaced apart relative to a chord axis CA of the aircraft so that the inlet and the outlet substantially do not overlap relative to the chord axis CA.

FIGS. 8 to 11 show an airfoil in accordance with a further embodiment. The airfoil in this embodiment is a wing 200 extending from the fuselage 202 of an aircraft. The wing 200 has an airfoil frame 204 enveloped by a skin structure 208. A leading edge LE and a trailing edge TE of the wing 200 define an upper surface 212 and a lower surface 216 of the skin structure 208 and the wing 200 over which air flows during forward flight of the aircraft 202 in a forward direction FD.

An airflow redirection structure includes a deflection surface is provided by a flap 210 that is positioned towards, and at least partially forms part of the trailing edge TE of the wing, is articulable between a forward flight position, in which the flap 210 extends generally rearwardly as is shown in FIGS. 8 to 11, and a vertical flight position, in which the flap 210 is reoriented to extend at least partially downwards.

A thrust system of the wing 200 includes a set of multipurpose thrust units 220 and a set of vertical thrust units 224 that are shown positioned entirely between the upper surface 212 and the lower surface 216 of the wing 200. In particular, subsets of two multipurpose thrust units 220 and four vertical thrust units 224 are alternatingly positioned spanwise along the wing 200. Each of the subsets of multipurpose thrust units 220 and vertical thrust units 224 are positioned within separate air ducts 226a, 226b that define air channels 228a, 228b maintaining airflows generated by the pairs of multipurpose thrust units 220 and the subsets of four vertical thrust units 224 separate from each other. The multipurpose thrust units 220 are spaced along the span of the wing 200, as are the vertical thrust units 224.

Each pair of the multipurpose thrust units 220 draws air via an exposed inlet 232 in the upper surface 212 of the skin structure 208 and into the respective air channel 228a. The exposed inlet 232 is always open in this embodiment, but it is contemplated that the exposed inlets 232 may be selectively covered in other embodiments. Each subset of four vertical thrust units 224 draws air via an inlet 236 in the upper surface 212 of the skin structure 208 that is selectively opened or closed via an inlet cover 240. The inlet cover 240 is connected to the airfoil frame 204 via a hinge structure 244 and is pivotable about a pivot axis of the hinge structure. In other embodiments, the inlets 236 can be covered or uncovered in any suitable manner, such as sliding covers that slide substantially parallel to the upper surface.

The airflow redirection structure also includes an outlet cover 248 that is connected to the airfoil frame 204 via a hinge structure 252 and is pivotable about a pivot axis of the hinge structure 252. The outlet cover 248 is shown in a forward flight position in FIGS. 8 to 11, wherein covering regions 256 of the outlet cover 248 cover outlets 260 of the air channels 228b. In addition, deflection surfaces in the form of vents 264 of the outlet cover 248 are positioned over outlets 268 of the air channels 228a when the outlet cover 248 is in the forward flight position.

In a forward flight mode, the inlet covers 240 cover the inlets 236 of the air channels 228b of the vertical thrust units 224, the outlet cover 248 covers the outlets 260 of the air channels 228b of the vertical thrust units 224 in the forward flight position, and the vertical thrust units 224 are inactive. The multipurpose thrust units 220 are active, drawing air generally downward into the air channels 228a through the exposed inlets 232, propelling it rearward. The shape of the duct units 226a is such that the airflow generated by the multipurpose thrust units 220 is directed generally downward towards the outlets 268. The vents 264 of the outlet cover 248 are shaped to deflect the airflow in a substantially rearward direction to generate forward thrust of the aircraft. The flap 210 is oriented to extend rearwardly.

Figure 12:
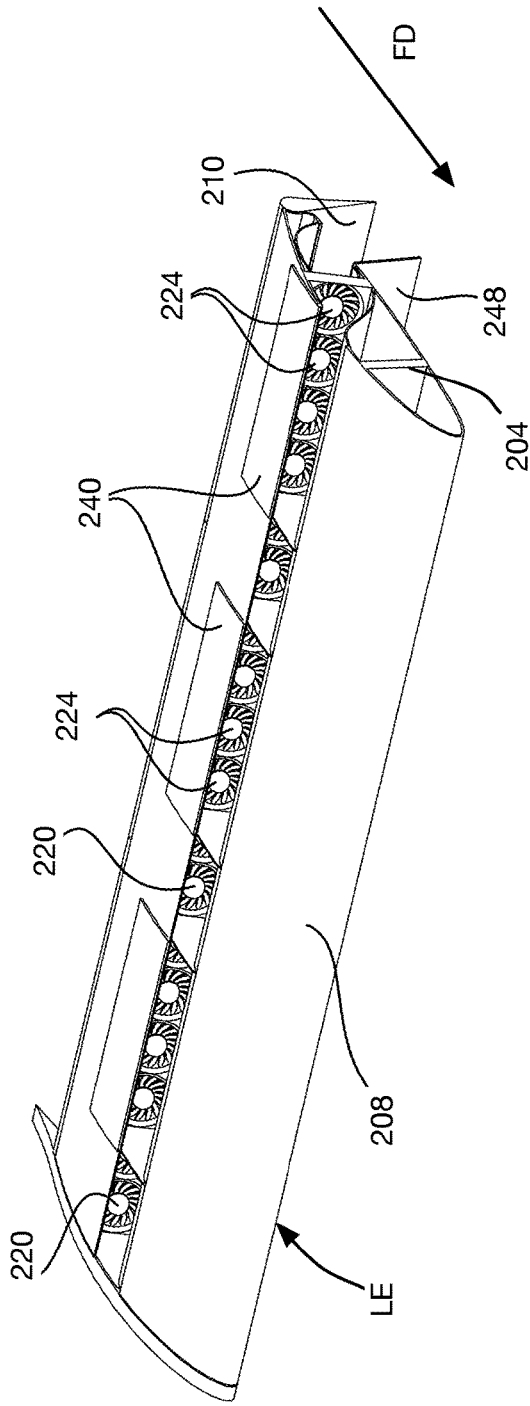
FIG. 12 is a front, top, right isometric view of the section of the wing shown in FIGS. 8 to 11, wherein the inlet covers for the vertical thrust units are in an open position and the rear flap extends downwardly.
Figure 13:
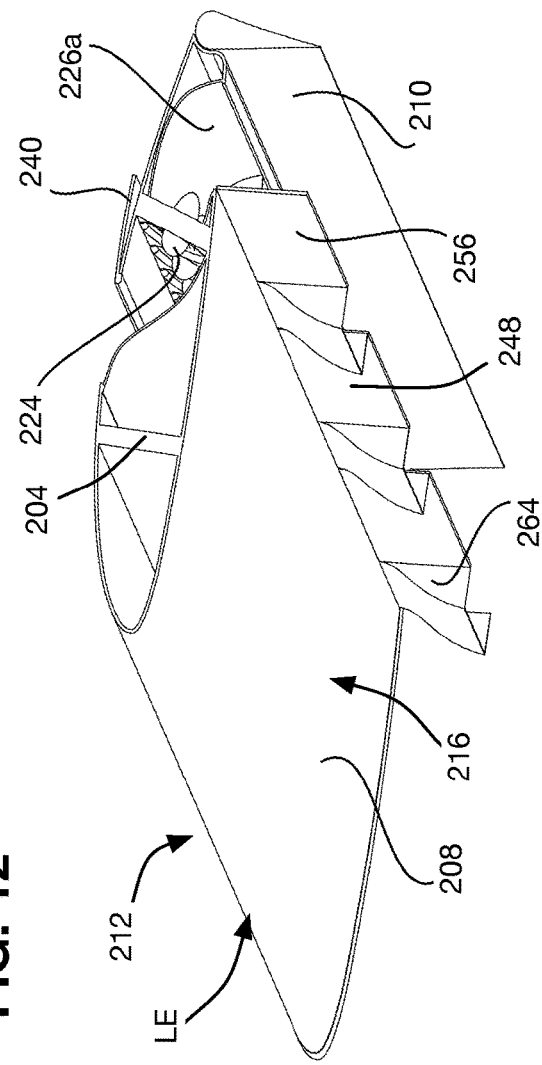
FIG. 13 is a front, bottom, right isometric view of the section of the wing in FIG. 12, wherein the outlet cover is in an open position.
Figure 14:
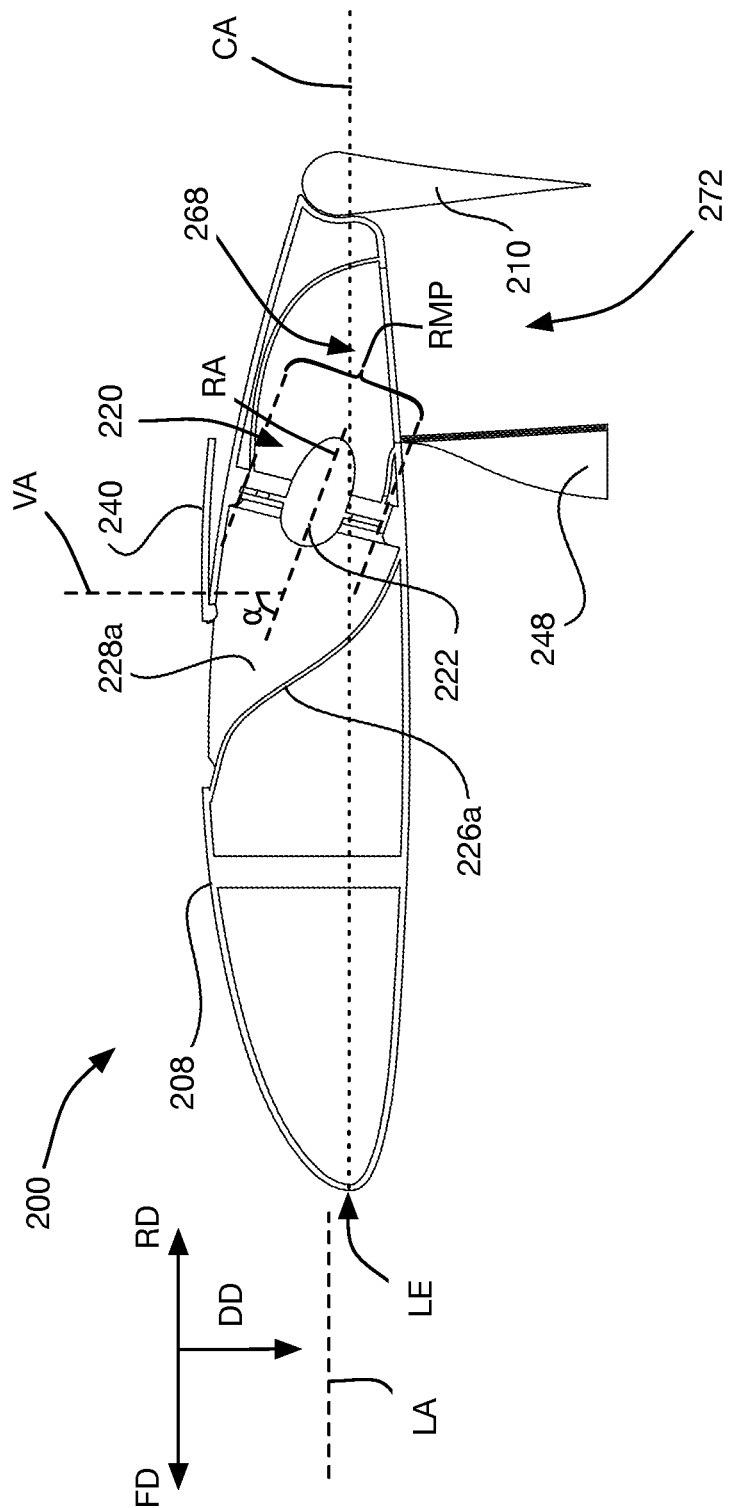
FIG. 14 is a side section view of the section of the wing of FIGS. 12 and 13 showing one of the inlet covers and the outlet cover in the open position and the rear flap extending downwardly.

When it is desired to take off or land (that is, when vertical thrust is required to achieve STOL or VTOL), the inlet covers 240 are pivoted to an open position, the outlet cover 248 is pivoted downward to a vertical flight position, and the flap 210 is pivoted downward to the vertical flight position, as is shown in FIGS. 12 to 14. The outlet cover 248 and the flap 210 can be moved/reoriented in any suitable manner, such as by pivoting, an articulating structure, etc. The vertical thrust units 224 are activated to generate an airflow, drawing air through the inlets 236 and expelling the airflow through the outlet 260. The multipurpose thrust units 220 draw air through the exposed inlets 232 and expel the airflow through the outlet 268.

When the outlet cover 248 is in the open position depending substantially downwardly as shown in FIGS. 12 to 14, the vents 264 of the outlet cover 248 are no longer in the path of the airflow and thus do not deflect the airflow from the multipurpose thrust units 220 from the substantially downward direction DD to the substantially rearward direction RD. The flap 210 and the outlet cover 248 both extend substantially downwardly, creating a channel 272 between them. As the airflows from the multipurpose thrust units 220 and the vertical thrust units 224 exit the outlets 268, 260 respectively, they are deflected generally downwards by the flap 210 and guided by the outlet cover 248 through the channel 272 to generate vertical thrust for the aircraft.

In some applications, the thrust fan(s) can pivot relative to the frame and the fuselage to provide thrusting force along more than one axis/vector. Thus, the thrust fans can provide both vertical and at least partially horizontal thrust.

While it would be readily understood by a person skilled in the art, the airfoil design can be used for both manned craft and unmanned craft, such as reconnaissance aircraft.

The airfoil design disclosed herein can also be used for hydrofoils of watercraft or any other type of craft that move through a fluid. It will be appreciated that the construction of hydrofoils can be adjusted to seal some components from water ingress.

While, in the above embodiments, more than one thrust fans are illustrated, it will be appreciated that in some applications, only one thrust fan can be employed.

The inventive principles described and illustrated with respect to the wing of the aircraft can also be applied to other airfoils of an aircraft, such as canards and empennages.

It may be understood that the various aspects and features may be mixed and matched as may be appropriate. It may also be understood that the foregoing is not intended to be an exhaustive listing of aspects and features of the invention. These and other aspects and features of the invention may be understood with reference to the description which precedes, and with the aid of the illustrations provided.

Various embodiments have been described in detail. Since changes in, and/or additions to, the above-described examples may be made without departing from the nature, spirit, or scope of the invention, the invention is not to be limited to those details.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. An aircraft airfoil having an internal thrust unit, comprising:
    a skin structure of the airfoil having a lower surface extending between a leading edge and a trailing edge of the airfoil over which air flows during forward flight of the aircraft;
    a thrust system connected to the skin structure and including a first thrust unit and a second thrust unit, the first thrust unit configured to generate a first airflow that is at least partially expelled through a first outlet in the lower surface of the skin structure, the second thrust unit configured to generate a second airflow that is at least partially expelled through a second outlet in the lower surface of the skin structure; and
    an outlet cover structure connected to the skin structure, the outlet cover structure having a deflection surface and a covering region, the outlet cover structure being movable between a forward flight position, in which the deflection surface is positioned over the first outlet to deflect the first airflow from the first outlet in an at least partially rearward direction and the covering region covers the second outlet, and a vertical flight position, in which the outlet cover structure is substantially clear of the airflow from the first outlet and the second outlet which is directed in an at least partially downward direction.

2. The aircraft airfoil of claim 1, wherein the deflection surface is a first deflection surface, the aircraft airfoil further comprising a second deflection surface moveably connected to the skin structure between a forward flight position, in which the second deflection surface is substantially clear of the airflow generated by the thrust system and deflected by the first deflection surface of the outlet cover structure in the forward flight position, and a vertical flight position, in which the second deflection surface is positioned to deflect the airflow in an at least partially downward direction.

3. The aircraft airfoil of claim 1, wherein the first airflow generated by the first thrust unit differs in power from the second airflow from the second thrust unit.

4. The aircraft airfoil of claim 1, further comprising an inlet cover movably connected to the skin structure toward a rear edge of an inlet in the skin structure through which air is drawn into the second thrust unit.

5. An aircraft airfoil having an internal thrust unit, comprising:
    a skin structure of the airfoil, wherein a leading edge and a trailing edge of the airfoil delineate an upper surface and a lower surface of the skin structure over which air flows during forward flight of the aircraft;
    a first thrust unit and a second thrust unit positioned entirely between the upper surface and the lower surface of the skin structure, the first thrust unit configured to generate a first airflow that is at least partially expelled through a first outlet along the lower surface of the skin structure, the second thrust unit configured to generate a second airflow that is at least partially expelled through a second outlet along the lower surface of the skin cover; and an airflow redirection structure including a first deflection surface, a second deflection surface, and a covering region, and being movable between a forward flight position, in which the first deflection surface of the airflow redirection structure is positioned over the first outlet and directs the first airflow in an at least partially rearward direction and the covering region is positioned over the second outlet, and a vertical flight position, in which the second deflection surface of the airflow redirection structure directs the airflow in an at least partially downward direction.

6. The aircraft airfoil of claim 5, wherein the airflow redirection structure includes an outlet cover structure that is connected to the skin structure, the outlet cover structure including the first deflection surface and the covering region, the outlet cover structure being movable between the forward flight position, in which the first deflection surface is positioned to deflect the first airflow in the at least partially rearward direction and the covering region is positioned over the second outlet, and a vertical flight position, in which the outlet cover structure is substantially clear of the airflow that is directed in an at least partially downward direction.

7. The aircraft airfoil of claim 5, wherein the second deflection surface is provided by a flap.

8. The aircraft airfoil of claim 7, wherein a channel is formed between the outlet cover structure and the flap to direct the airflow in the at least partially downward direction when the outlet cover structure and the flap are in the vertical flight position.

9. The aircraft airfoil of claim 5, wherein the second airflow generated by the second thrust unit when the outlet cover structure is in the forward flight position is less than when the outlet cover structure is in the vertical flight position.

10. The aircraft airfoil of claim 1, wherein the second thrust generated by the second thrust unit when the outlet cover structure is in the forward flight position is lesser than when the outlet cover structure is in the vertical flight position.

11. The aircraft airfoil of claim 10, wherein operation of the second thrust unit is terminated when the outlet cover structure is in the forward flight position.

12. An aircraft airfoil having an internal thrust unit, comprising:
a skin structure of the airfoil having a lower surface extending between a leading edge and a trailing edge of the airfoil over which air flows during forward flight of the aircraft;
a thrust system connected to the skin structure generating an airflow that is at least partially expelled through an outlet structure in the lower surface of the skin structure; and
an outlet cover structure connected to the skin structure, the outlet cover structure having a deflection surface and a covering region, the outlet cover structure being movable between a forward flight position, wherein the deflection surface is positioned to deflect the airflow in an at least partially rearward direction and the covering region at least partially covers the outlet structure, and a vertical flight position, in which the outlet cover structure is substantially clear of the airflow from the outlet structure which is directed in an at least partially downward direction.

13. The aircraft airfoil of claim 12, wherein the outlet structure includes a first outlet over which the deflection surface is positioned in the forward flight position and a second outlet over which the covering region is positioned in the forward flight position.

* * * * *